Figure 1:
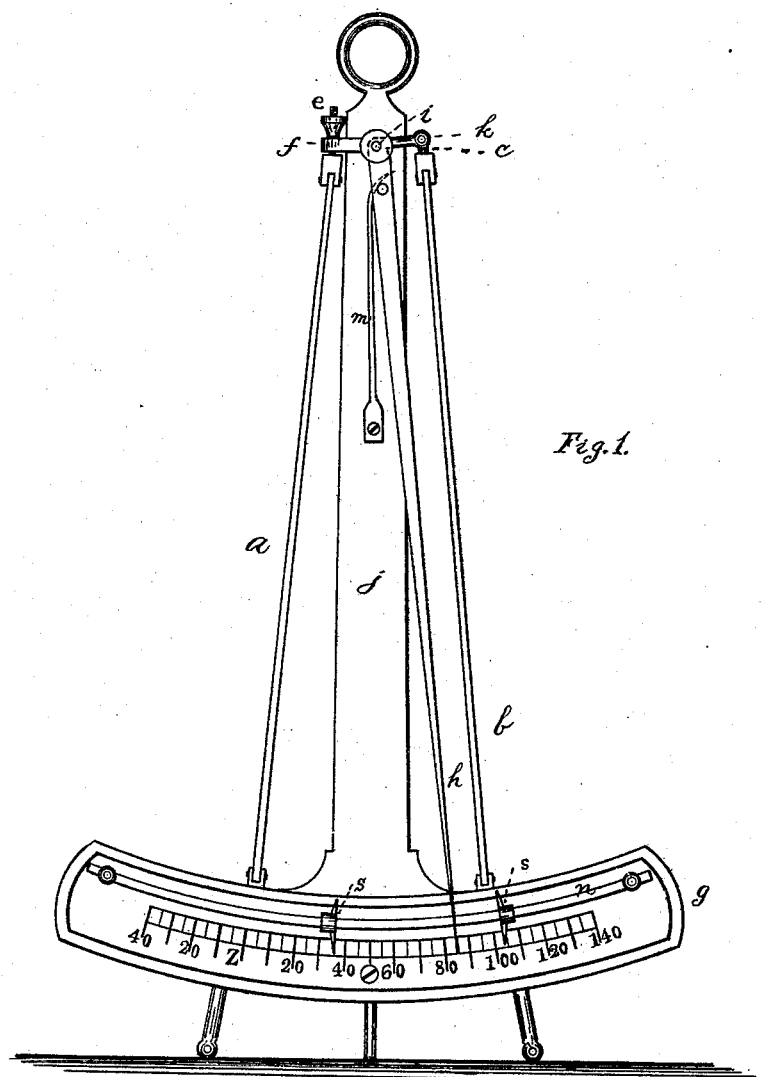

2 Sheets—Sheet 1.

G. W. SCHUMACHER.
THERMOMETER.

No. 172,181.  Patented Jan. 11, 1876.

Witnesses:
Frank H. Jordan
Edgar S. Brown

Inventor:
Gustav W. Schumacher
per Wm. Henry Clifford,
atty.

G. W. SCHUMACHER.
THERMOMETER.
No. 172,181. Patented Jan. 11, 1876.
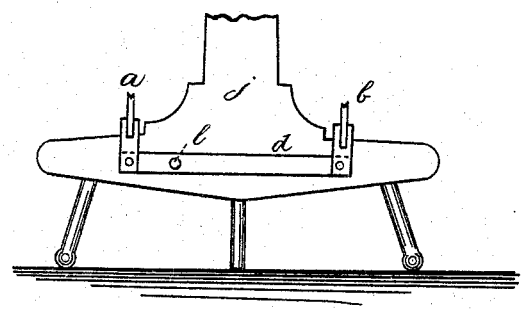
Fig. 2.
Fig. 4.
Fig. 3.

UNITED STATES PATENT OFFICE.

GUSTAV W. SCHUMACHER, OF PORTLAND, MAINE.

IMPROVEMENT IN THERMOMETERS.

Specification forming part of Letters Patent No. 172,181, dated January 11, 1876; application filed December 8, 1875.

*To all whom it may concern:*

Be it known that I, GUSTAV W. SCHUMACHER, of Portland, in the county of Cumberland and State of Maine, have invented certain new and useful Improvements in Thermometers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a front or face view of my invention. Fig. 2 is a detail view, showing the arrangement of the lower lever and the connection of the rubber arms with the same. Fig. 3 is a detail front, and Fig. 4 a cross-sectional, view of the rubber arms, showing the corrugations.

Same letters show like parts.

My invention relates to a registering-thermometer operated by the contractile and expansive power and property of two hard-rubber arms, the more particular operation of which will be hereinafter described. These arms are so arranged and adjusted that one of them is permitted to expand and contract in such way as to move levers attached at both ends of another arm, by which movement the operations of the instrument are effected.

The arm first referred to is indicated at $a$. The other at $b$. The arm $b$ has attached to it two levers, $c$ and $d$. The arm $a$ is fixed at its upper end by means of a set-screw, $e$, working in a screw-hole in the piece $f$. $g$ is the plate containing the register or scale, and upon which are marked off the different degrees. $h$ is the finger or indicator, which at its lower end points out upon the scale the different degrees of temperature as it is moved by the contraction and expansion produced by heat or cold. The indicator $h$ is rigidly attached to a small sleeve surrounding a small stud or pin, $i$, which stud or pin is inserted into a back-plate, $j$. The indicator $h$ and the short lever $k$ are both rigidly attached to the sleeve. As the rubber arm $a$ contracts or expands it moves the lever $d$ upon its pivot $l$. The long arm of this lever is attached to the lower end of the arm $b$, which arm at its upper end, as before specified, is attached to the lever $k$. Thus the movement at the end of the lever $d$, where it is connected with the rubber arm $b$, is increased from that produced on the short arm of this lever, where it is connected with the arm $a$, in proportion as the long arm is longer than the short one. This movement is also assisted by the contraction and expansion of the arm $b$. The movement of the indicator, produced by the contraction of the arm $a$, is such as to show on the registering-plate low degrees of temperature, and the other movement higher ones. The use of the set-screw $e$ is to place the point of the indicator at the proper degree on the registering-plate when the thermometer is adjusted for actual use. This may be done by obtaining the correct degree from a reliable standard, both instruments being at the same temperature. $m$ is a spring, bearing upon the indicator $h$, and tending to move the same upwardly on the scale of the registering-plate. When the arm $a$, with its other arm $b$, are subjected to cold, and contracted, they move the indicator downwardly on the scale and against the force of the spring $m$. When the arms are expanded by warmth the spring $m$ moves the indicator upwarly on the scale as far as it is permitted to do by said expansion. On the front of the registering-plate is set a curved rod, $n$, or any equivalent device. This is to receive two movable pointers, which are impelled on the rod or track by the indicator $h$. The purpose of these two pointers is to record extremes of temperature during an interval of time in which the thermometer may not have been consulted, or if the change of temperature is only in one direction, to show the difference between the time when the registering-plate was last examined and some other time when an examination is intended to be made. These devices will of course remain at the extreme points to which they are pushed by the indicator. The arms $a$ and $b$ are corrugated in order to expose to the action of the temperature of the air the largest possible amount of surface. When exposed to cold the contraction of the arms, acting upon the levers, as described, causes the indicator so to move along the scale as to indicate the proper low degree of temperature, and heat or warmth, and the consequent expansion permits the spring $m$ to operate the indicator to such an extent as will show the proper opposite degree of temperature. The spring $m$ also serves to maintain a proper strain upon the different parts of the thermometer and prevent "play" of the same, so as to insure as nearly as may be an exact operation. $s\ s$ show the pointers.

What I claim as my invention, and desire to secure by Letters Patent, is—

1. The hard-rubber arm $a$, in combination with the lever $d$, arm $b$, lever $k$, and indicator $h$, the same operating to point out different degrees of temperature upon a registering plate or scale, as herein described.

2. The arm $a$, with its adjusting set-screw $e$, and piece $f$, with the lever $d$, lever $k$, indicator and scale, as set forth, and with the arm $b$.

3. The combination of the rubber arms $a\ b$, levers $d\ k$, indicator $h$, and the registering devices moving on the curved rod $n$, substantially as and for the purposes herein set forth.

4. The two corrugated rubber arms, arranged and combined as described, to operate the indicator of a thermometer, so as to show, in connection with a spring pressing upon said indicator, different degrees of temperature, as set forth.

In testimony that I claim the foregoing as my own I affix my signature in presence of two witnesses.

GUSTAV W. SCHUMACHER.

Witnesses:
WILLIAM HENRY CLIFFORD,
FRANK H. JORDON.